United States Patent
Pastrick

(10) Patent No.: US 9,868,476 B1
(45) Date of Patent: Jan. 16, 2018

(54) VEHICLE BODY-IN-WHITE STRUCTURE

(71) Applicant: FORD GLOBAL TECHNOLOGIES, LLC, Dearborn, MI (US)

(72) Inventor: Richard Daniel Pastrick, Roseville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/286,187

(22) Filed: Oct. 5, 2016

(51) Int. Cl.
*B62D 25/02* (2006.01)
*B62D 25/04* (2006.01)
*B62D 25/20* (2006.01)
*B62D 25/06* (2006.01)
*B62D 27/02* (2006.01)
*F16B 5/08* (2006.01)
*B62D 29/00* (2006.01)
*B62D 65/02* (2006.01)

(52) U.S. Cl.
CPC .......... *B62D 27/023* (2013.01); *B62D 25/02* (2013.01); *B62D 25/04* (2013.01); *B62D 25/06* (2013.01); *B62D 25/2036* (2013.01); *B62D 27/026* (2013.01); *B62D 29/005* (2013.01); *B62D 65/024* (2013.01); *F16B 5/08* (2013.01)

(58) Field of Classification Search
CPC .... B62D 27/023; B62D 27/026; B62D 25/02; B62D 25/04; B62D 25/06; B62D 25/2036; B62D 29/005; B62D 65/024; F16B 5/08

USPC .................... 296/203.03, 204, 210
See application file for complete search history.

(56) References Cited

U.S. PATENT DOCUMENTS

| | | | |
|---|---|---|---|
| 7,543,884 B2 * | 6/2009 | Reed ............... | B62D 25/04 296/203.01 |
| 2011/0133521 A1 * | 6/2011 | Yu .................. | B62D 25/06 296/210 |
| 2013/0341971 A1 * | 12/2013 | Masini ............ | B29C 70/86 296/210 |
| 2014/0294489 A1 * | 10/2014 | Sakai .............. | B62D 25/02 403/267 |
| 2015/0001189 A1 | 1/2015 | Spinella et al. | |
| 2015/0053328 A1 | 2/2015 | Wang et al. | |
| 2015/0059958 A1 | 3/2015 | Wang | |
| 2015/0108793 A1 * | 4/2015 | Peschansky ..... | B62D 29/041 296/204 |
| 2016/0114836 A1 * | 4/2016 | Huff ............... | B62D 27/02 403/265 |
| 2016/0138637 A1 * | 5/2016 | Kurokawa ....... | F16B 5/045 411/82.1 |
| 2016/0347377 A1 * | 12/2016 | Minei ............. | B29C 65/56 |
| 2017/0073021 A1 * | 3/2017 | Roddy ............ | B62D 25/06 |

\* cited by examiner

*Primary Examiner* — Gregory A Blankenship
(74) *Attorney, Agent, or Firm* — Jason Rogers; Brooks Kushman P.C.

(57) ABSTRACT

A vehicle body includes a non-metallic member, metallic disk, and metallic member. The metallic disk is rigidly affixed to the non-metallic member such that a periphery of the disk is encompassed by the non-metallic member while an outer surface of the disk remains exposed. The metallic member is secured to the non-metallic member by a spot weld extending from the metallic member, through the outer surface, and into the disk.

19 Claims, 2 Drawing Sheets

VEHICLE BODY-IN-WHITE STRUCTURE

TECHNICAL FIELD

The present disclosure relates to a vehicle body-in-white structure and a method of forming the vehicle body-in-white structure.

BACKGROUND

Vehicle body-in-white structures may be formed by joining several components together during vehicle production.

SUMMARY

A vehicle body includes a non-metallic member, metallic disk, and metallic member. The metallic disk is rigidly affixed to the non-metallic member such that a periphery of the disk is encompassed by the non-metallic member while an outer surface of the disk remains exposed. The metallic member is secured to the non-metallic member by a spot weld extending from the metallic member, through the outer surface, and into the disk.

A vehicle body includes a first member, metallic disk, and metallic member. The first member has first and second external surfaces. The first member defines an orifice that extends from the first external surface to the second external surface. The metallic disk has first and second outer surfaces. The metallic disk is secured within the orifice such that a periphery of the disk is encompassed by the first member and the first outer surface is substantially flush with first external surface. The metallic member is secured to the first member by a spot weld that extends from the metallic member, through the first outer surface, and into the disk.

A method of forming a vehicle body includes press-fitting a metallic disk into an orifice of a non-metallic body-member and spot welding the metallic disk to a metallic body-member such that the non-metallic body-member is secured to the metallic body-member.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
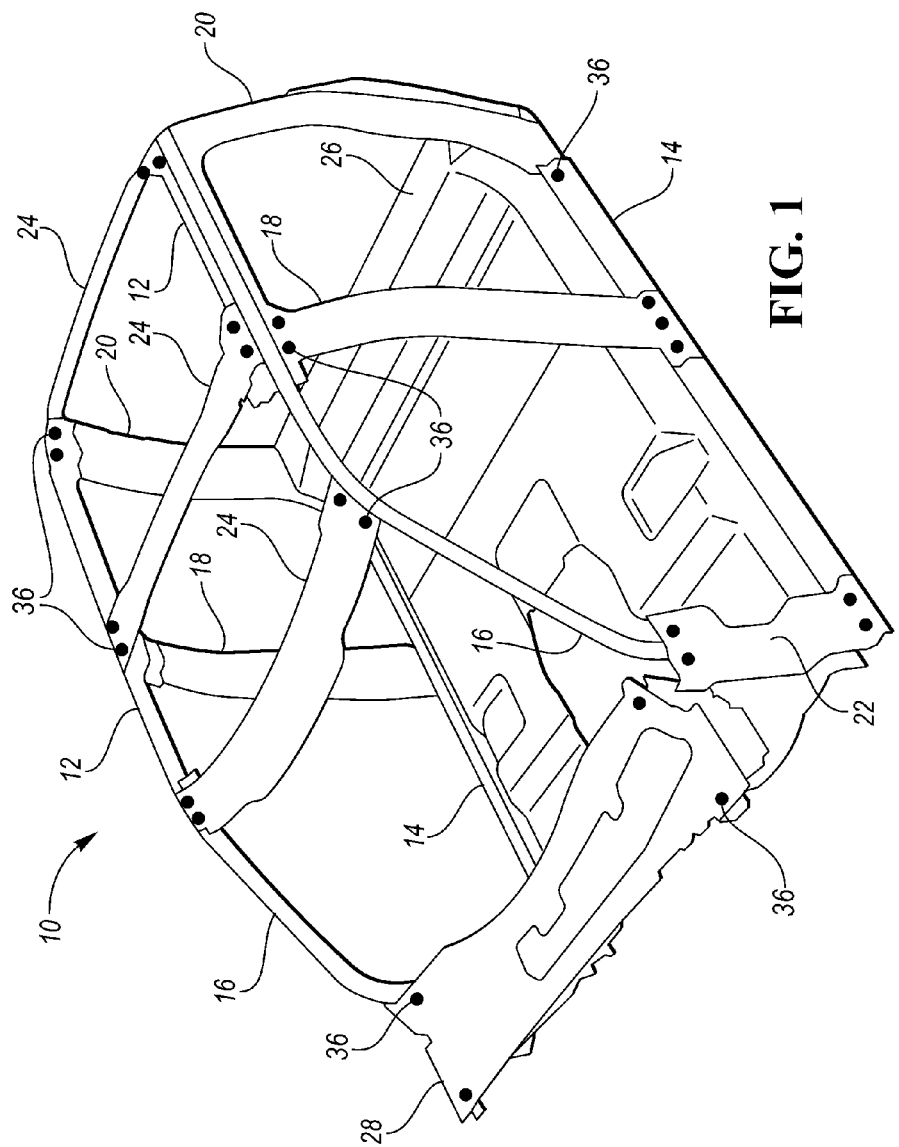
FIG. 1 is an isometric view of a representative vehicle body-in-white structure.

Referring to FIG. 1, a representative vehicle body-in-white structure 10 is illustrated. The vehicle body-in-white structure 10 includes, among other components, a pair of vehicle body side panels that are connected to each other by a series of cross members. The cross members may also be referred to as headers. The vehicle body side panels include a series of pillars that extend between and are connected to a roof rail 12 and a rocker rail 14. The depicted embodiment includes an A-pillar 16, B-pillar 18, and C-pillar 20. It should be understood, however, that the vehicle body-in-white structure 10 may include additional pillars, such as a D-pillar, that extend between the roof rail 12 and rocker rail 14. A hinge pillar 22 may connect the A-pillar to the rocker rail 14. Roof cross members 24 extend between and are connected each of the roof rails 12 of the pair of vehicle body side panels. The roof cross members 24 may also be referred to as roof headers located in front, middle, and rear positions. A floor panel 26 extends between and is connected to each of the rocker rails 14 of the pair of vehicle body side panels. A dashboard panel 28 also extends and is connected to each of the pair of vehicle body side panels in a position forward of the A-pillar 16.

The vehicle body-in-white structure 10 depicted in FIG. 1 is meant for exemplary purposes only. The disclosure should be construed to include body-in-white structures for any type of vehicle including cars and trucks. The vehicle body-in-white structure 10 may include additional components not depicted in FIG. 1 including, but not limited to, D-pillars, engine compartment support members, strut towers, floor cross members, roof panels, firewalls, radiator core supports, trunk compartment support members, package trays located above the trunk compartment, or any other component of the vehicle body-in-white structure or the frame known in the art.

The vehicle body-in-white components may be made from a metallic, plastic, or composite material. Plastics may include any desirable plastic material suitable for structural components including thermoplastics and thermoset plastics. Metallic materials may include any metal suitable for structural components including, but not limited to, steel, aluminum alloys, or magnesium alloys. Composite materials may include any composite material suitable for structural components, such as fiber-reinforced plastics. Fiber-reinforced plastics (also known as fiber-reinforced polymers) are composite materials made of a polymer matrix reinforced with fibers. The fibers may be glass, carbon, basalt, aramid or any other reinforcing material suitable for producing fiber-reinforced plastics. The polymer may be an epoxy, vinylester, polyester thermosetting plastic, phenol formaldehyde resin, or any other polymer or plastic suitable for producing fiber-reinforced plastics. Fiber-reinforced plastics may also be heat and/or pressure cured.

Figure 2A:
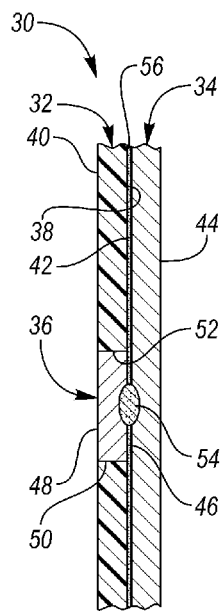
FIG. 2A is a cross-sectional view of a first embodiment of a representative joint between two of the members of the vehicle body-in-white structure.
Figure 2B:
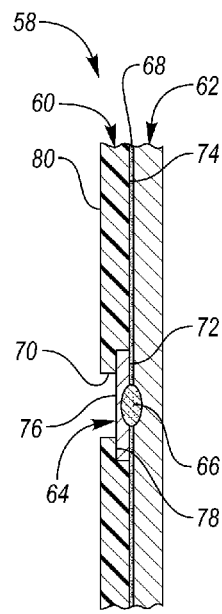
FIG. 2B is a cross-sectional view of a second embodiment of the representative joint between two of the members of the vehicle body-in-white structure.
Figure 2C:
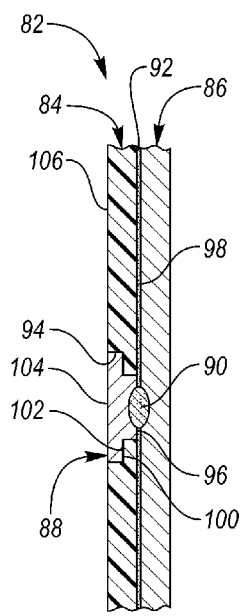
FIG. 2C is a cross-sectional view of a third embodiment of the representative joint between two of the members of the vehicle body-in-white structure.

Referring to FIG. 2A-2C, three cross-sectional views of three embodiments of a representative joint between two members of a vehicle body-in-white structure are illustrated. A joint may refer to the place at which two things, or separate parts of one thing, are joined or united. The joints depicted in FIG. 2A-2C may include any joint of a vehicle body-in-white structure where any two or more components of the vehicle body-in-whiter structure are joined together, including but not limited to, the vehicle body-in-white components described above and/or illustrated in FIG. 1.

Referring to FIG. 2A a first embodiment of a joint 30 of a vehicle body-in-white structure is illustrated. The joint 30 includes a first member 32, second member 34, and metallic disk 36. The first member 32 may be made from any appropriate non-metallic material or a metallic material, including but not limited to, any of the plastic, composite, or metallic materials listed above. The second member 34 and the metallic disk 36 may each be made from any appropriate metallic material, including but not limited to, any of the metallic materials listed above. More specifically, the second member 34 and the metallic disk 36 may each be made from the same metallic material.

The first member 32 includes a first external surface 38 and a second external surface 40. The second external surface 40 may be located on the opposite side of the first member 32 relative to the first external surface 38. The second member 34 includes a third external surface 42 and a fourth external surface 44. The fourth external surface 44 may be located on an opposite side of the second member 34 relative to the third external surface 42. Alternatively, the first external surface 38 may be referred to the second, third, or four external surface; the second external surface may be referred to as the first, third, or fourth external surface; the third external surface may be referred to as the first, second, or fourth external surface; and the fourth external surface may be referred to as the first, second, or third external surface. The metallic disk 36 includes a first outer surface 46, second outer surface 48, and periphery (or peripheral edge or surface) 50. The first member 32 defines an opening or orifice 52 that extends from the first external surface 38 to the second external surface 40. The opening or orifice 52 may be defined by the first external surface 38 or the second external surface 40 of the first member 32.

The metallic disk 36 may be rigidly affixed to the first member 32 such that the periphery 50 of the metallic disk 36 is encompassed or surrounded by the first member 32 while the first outer surface 46 of the metallic disk 36 and the second outer surface 48 of the metallic disk 36 may be exposed through the orifice 52 defined by the first member 32. The second outer surface 48 may be located on an opposite side of the disk 36 relative to the first outer surface 46. The first outer surface 46 of the metallic disk 36 may be flush or substantially flush with the first external surface 38 of the first member 32. Substantially flush may refer any incremental deviation up to 0.5 mm from perfectly flush. The first outer surface 46 of the metallic disk 36 may only remain exposed prior to joining the first member 32 to the second member 34. The second outer surface 48 of the metallic disk 36 may be flush or substantially flush with the second external surface 40 of the first member 32. Substantially flush may refer any incremental deviation up to 0.5 mm from perfectly flush. The metallic disk 36 may be also be disposed within the orifice 52 defined by the first member 32.

The metallic disk 36 may be affixed to the first member 32 via an adhesive or via a press-fitting operation. If the metallic disk 36 is affixed to the first member 32 via a press-fitting operation, the diameter of the metallic disk 36 will be slightly larger than the diameter of the orifice 52. The second member 34 may be secured to the first member 32 by spot weld 54 that extends from the second member 34, through the first outer surface 46 of the metallic disk 36, and into the metallic disk 36. The second member 34 may also be secured to the first member 32 by an adhesive layer 56. More specifically, the first external surface 38 of the first member 32 may be secured to the third external surface 42 of the second member 34 by the adhesive layer 56. During the manufacturing process the spot weld 54 may secure the first member 32 to the second member 34 while the adhesive layer 56 cures.

Referring to FIG. 2B a second embodiment of a joint 58 of a vehicle body-in-white structure is illustrated. The joint 58 includes a first member 60, second member 62, metallic disk 64, spot weld 66, and adhesive layer 68. Unless otherwise described, the second embodiment of a joint 58 should be construed to have all of the same components and/or characteristics of the first embodiment of a joint 30, unless described herein. The first member 60 defines a stepped orifice 70. The metallic disk 64 may be disposed within the stepped orifice such that a first outer surface 72 of the metallic disk 64 is flush or substantially flush with a first external surface 74 of the first member 60 and such that a second outer surface 76 of the metallic disk 64, that is located on an opposite side of the metallic disk 64 relative to the first outer surface 72, is flush or substantially flush with a step-defining surface 78 located within the stepped orifice 70. Substantially flush may refer any incremental deviation up to 0.5 mm from perfectly flush. The second outer surface 76 of the metallic disk 64 may be exposed through the stepped orifice 70. However, a second external surface 80 of the first member 60, that is located on an opposite side of the first member 60 relative to the first external surface 74, may partially overlap the second outer surface 76 of the metallic disk 64.

Referring to FIG. 2C a third embodiment of a joint 82 of a vehicle body-in-white structure is illustrated. The joint 82 includes a first member 84, second member 86, metallic disk 88, spot weld 90, and adhesive layer 92. Unless otherwise described, the third embodiment of a joint 82 should be construed to have all of the same components and/or characteristics of the first embodiment of a joint 30, unless described herein. The first member 84 defines a stepped orifice 94. The metallic disk 88 may be disposed within the stepped orifice such that a first outer surface 96 of the metallic disk 88 is flush or substantially flush with a first external surface 98 of the first member 84 and such that a second outer surface 100 of the metallic disk 88 is flush or substantially flush with a step-defining surface 102 located within the stepped orifice 94. Substantially flush may refer any incremental deviation up to 0.5 mm from perfectly flush. A third outer surface 104 of the metallic disk 88, that is located on an opposite side of the metallic disk 88 relative to the first outer surface 96, may be flush or substantially flush with a second external surface 106 of the first member 84, that is located on an opposite side of the first member 84 relative to the first external surface 98.

Figure 3:
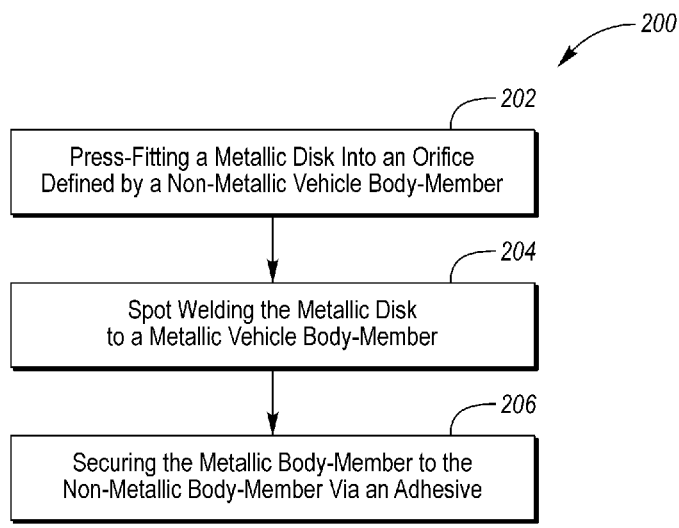
FIG. 3 is a method of forming a vehicle body-in-white structure.

Referring to FIG. 3, a method 200 of forming a vehicle body-in-white structure is illustrated. The method 200 begins at step 202 where a metallic disk is press-fit into an orifice defined by a non-metallic body-member. Alternatively, the non-metallic body-member may be a metallic member that is made from a dissimilar metal from the metallic disk. The metallic disk may be press fit into the non-metallic body-member such that an outer surface of the metallic disk is flush or substantially flush with an external surface of the non-metallic body-member. Substantially flush may refer any incremental deviation up to 0.5 mm from perfectly flush. Next, the method 200 moves on to step 204 where the metallic disk is spot welded to a metallic body-member such that the non-metallic body-member is secured to the metallic body-member. The metallic disk and the metallic body-member may be made from the same metallic material. The method 200 then moves on to step 206 where the metallic body-member is secured to the non-metallic body-member via an adhesive. Alternatively at step 206, the metallic body-member may be secured to the non-metallic body-member via self-piercing rivets, flow drill screws, nails, or by any other method known in the art. More specifically, the external surface of the non-metallic body-member may be secured to the metallic body-member via the adhesive. It should be understood that the flowchart in FIG. 3 is for illustrative purposes only and that the method 200 should not be construed as limited to the flowchart in FIG. 3. Some of the steps of the method 200 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle body comprising:
   a non-metallic member defining an orifice;
   a metallic disk having first and second outer surfaces and secured within the orifice such that a periphery of the disk is encompassed by the non-metallic member and the second outer surface engages a step within the orifice; and
   a metallic member secured to the non-metallic member by a spot weld extending from the metallic member, through the first outer surface, and into the disk.

2. The vehicle body of claim 1, wherein the non-metallic member has a first external surface that is substantially flush with the first outer surface of the disk and the metallic member has a second external surface that is secured to the first external surface by an adhesive.

3. The vehicle body of claim 2, wherein the disk includes a third outer surface that is located on an opposite side of the disk relative to the first outer surface, the non-metallic member includes a third external surface that is located on an opposite side of the non-metallic member relative to the first external surface, and the third external surface defines the orifice which exposes the third outer surface.

4. The vehicle body of claim 3, wherein the third external surface partially overlaps the third outer surface.

5. The vehicle body of claim 3, wherein the third external surface is substantially flush with the third outer surface.

6. The vehicle body of claim 1, wherein the non-metallic member is a cross member and the metallic member is a vehicle body side panel.

7. The vehicle body of claim 1, wherein the non-metallic member is a cross member and the metallic member is a roof rail.

8. The vehicle body of claim 1, wherein the metallic disk and the metallic member are composed of the same metallic material.

9. A vehicle body comprising:
   a first member having first and second external surfaces and defining a stepped orifice that extends from the first external surface to the second external surface;
   a metallic disk having first and second outer surfaces and secured within the orifice such that a periphery of the disk is encompassed by the first member, the first outer surface is substantially flush with the first external surface, and the second outer surface is substantially flush with a step in the orifice; and
   a metallic member secured to the first member by a spot weld extending from the metallic member, through the first outer surface, and into the disk.

10. The vehicle body of claim 9, wherein the metallic member has a third external surface that is secured to the first external surface by an adhesive.

11. The vehicle body of claim 9, wherein the first member is a cross member and the metallic member is a vehicle body side panel.

12. The vehicle body of claim 9, wherein the first member is a cross member and the metallic member is a roof rail.

13. The vehicle body of claim 9, wherein the metallic disk and the metallic member are composed of the same metallic material.

14. The vehicle body of claim 13, wherein the first member is composed of a non-metallic material.

15. The vehicle body of claim 13, wherein the first member is composed of a metallic material that is dissimilar from the metallic material composing the metallic member.

16. A method of forming a vehicle body comprising:
   press-fitting a metallic disk into an orifice defined by a non-metallic body-member such that that a periphery of the disk is encompassed by the non-metallic body-member and an outer surface of the disk engages a step within the orifice; and
   spot welding the metallic disk to a metallic body-member such that the non-metallic body-member is secured to the metallic body-member.

17. The method of claim 16 further comprising securing the non-metallic body-member to the metallic body-member via an adhesive.

18. The method of claim 17, wherein the metallic disk is press-fit into the orifice such that a second outer surface of the metallic disk is substantially flush with an external surface of the non-metallic body-member.

19. The method of claim 18, wherein the external surface of the non-metallic body-member is secured to the metallic body-member via the adhesive.

* * * * *